United States Patent [19]

Albanese

[11] 4,152,043
[45] May 1, 1979

[54] ELECTROSTATIC OPTICAL SWITCH WITH ELECTRICAL CONNECTION TO COATED OPTICAL FIBER

[75] Inventor: Andres Albanese, Matawan, N.J.

[73] Assignee: Bell Telephone Laboratories, Incorporated, Murray Hill, N.J.

[21] Appl. No.: 827,578

[22] Filed: Aug. 25, 1977

[51] Int. Cl.² .............................................. G02B 5/14
[52] U.S. Cl. ............................................... 350/96.20
[58] Field of Search ................... 350/96, 20; 361/234

[56] References Cited

U.S. PATENT DOCUMENTS 3,470,320  9/1969  Pike et al. ........................ 350/96.20

FOREIGN PATENT DOCUMENTS 2016498  10/1971  Fed. Rep. of Germany ........ 350/96.20

OTHER PUBLICATIONS

Leighton, "Fiber Optic Shutter", *IBM Tech. Disc. Bulletin*, vol. 11, No. 8, Jun. 1969, pp. 912-913, (located 350/96.20).
Hale et al, "Mechanical Optical-Fibre Switch", *Electronics Letters*, vol. 12, No. 15, Jul. 1976, p. 388, (located 350/96.20).
Ede, "Linked Optical and Fiber Optic Components", Proceedings of Electro-Optical Systems Design Conf., N.Y.C., Sep. 1969, pp. 205-211.

*Primary Examiner*—John K. Corbin
*Assistant Examiner*—Stewart Levy
*Attorney, Agent, or Firm*—John K. Mullarney

[57] ABSTRACT

An electrical optical fiber switch includes first, second and third optical fibers located so that a lateral movement of the first optical fiber breaks optical connection with the second and makes optical connection with the third. The first optical fiber is coated with an electrically conductive substance which is electrically switched to a positive or negative side of a DC voltage source. Electrodes disposed adjacent to the first fiber are connected across the voltage source. Depending on the resulting polarity of the first fiber coating, the first fiber is electrostatically moved between the electrodes so as to accomplish optical switching. A dielectric coating or barrier is provided on the first fiber coating or on the electrodes so as to prevent electrical contact. Many such optical fiber switches can be provided on a planar optical switch board for optical test terminations in an optical fiber communications system.

3 Claims, 8 Drawing Figures

ELECTROSTATIC OPTICAL SWITCH WITH ELECTRICAL CONNECTION TO COATED OPTICAL FIBER

BACKGROUND OF THE INVENTION

The present invention relates to apparatus for controlling the transmission of light along optical fibers. More specifically the present invention relates to apparatus for optical switching by moving optical fibers under the influence of an electrostatic force.

In recent years, the technology of making very thin, highly transparent threads or fibers of glass for carrying light in the infrared, visible, and ultraviolet regions of the spectrum has greatly advanced. At the present time, the use of optical fibers for transmitting communication signals appears both technologically feasible and economically practical. However, a form of testing or switching device is needed so that the state of light transmission on optical fibers can be readily ascertained without need of inconvenient physical handling and consequent deterioration of the fibers and their connections. Presently contemplated optical fiber cables can employ a plurality of tape-like layers of parallel optical fibers, and it would be advantageous to provide optical fiber switches and test points for such cables which additionally have a relatively planar geometry capable of accommodating many parallel optical fibers having a relatively close spacing.

SUMMARY OF THE INVENTION

According to the present invention optical fiber connections are able to be made and broken in a structure having an essentially planar geometry by advantageous electrostatic means. An optical fiber is provided with an electrically conductive coating which can be connected to either a positive or negative pole of a source of electrical voltage. On either side of the optical fiber are located two electrodes respectively connected to the positive and negative poles. When the fiber coating is coupled, or connected, to a positive pole of the voltage source, or equivalently to the electrode of the same polarity, the coated fiber is electrostatically repelled from the positive electrode and attracted to the negative electrode so as to move laterally toward the negative electrode. When the fiber coating is connected to a negative electrode it moves in the opposite direction. Thus, an optical connection to one or more terminating fibers may be made and broken at will be the switchable electrical connection of the optical fiber coating and consequent movement of the coated fiber. The certainty and sensitivity of the switching are both advantageous because repulsive as well as attractive forces are employed by virtue of energizing the conductive coating of the movable fiber, as well as the electrodes. Many optical fibers, as in an optical fiber cable, may be laid out in parallel on a switch board provided with electrodes and voltage-providing conductors having inexpensive electrical-optical printed circuit form. Dielectric stop material is provided on each conductive fiber coating or on the electrodes or in other suitable fashion so that no conductive fiber coating makes electrical contact with the electrodes. Optical fibers may be switched by mere pulses of electricity when a dual polarity voltage source is employed and each fiber coating is connected to ground.

DETAILED DESCRIPTION OF THE DRAWING

Figure 1:
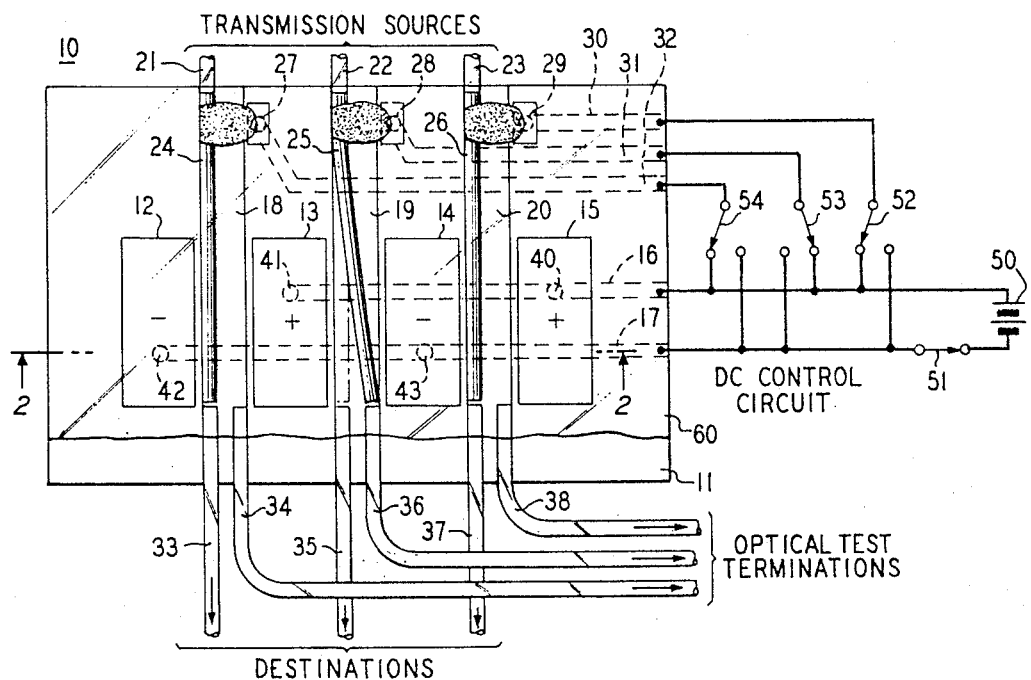
FIG. 1 shows an electrostatic optical switch board according to the present invention in plan view together with a schematic diagram of an accompanying control circuit.

In FIG. 1, a plurality of transmission sources transmit light over an optical fiber cable (not shown) having at least one layer of optical fibers 21, 22 and 23 of approximately 100 microns diameter. The fibers, which are silica fibers with germania doped silica cores, are affixed in corresponding channels 18, 19 and 20 of electrostatic optical switch assembly 10. A DC control circuit selectively switches the optical fibers so that light is able to pass to destination fibers 33, 35 and 37 or to optical test termination fibers 34, 36 and 38. The three fibers 21, 22 and 23 have electrically conductive coatings 24, 25 and 26 and are respectively held in the three parallel channels 18, 19 and 20 by conductive adhesive silver paint and side conductors 27, 28 and 29 which permit electrical connection to voltage providing conductors 32, 31 and 30 respectively.

Four electrode strips 12, 13, 14 and 15, which are in general equal in number to one more than the number of channels and are disposed in a common plane between and on either side of the channels, are fabricated by chemical etching and connected to voltage source 50 so as to bear electric charges of spatially alternating polarity. Thus, DC source 50, which can be switched off with ON-OFF power switch 51, is electrically connected across every pair of adjacent electrodes. For this purpose positive buss conductor 16 is connected to electrodes 13 and 15 by means of metallic junctions 41 and 40 respectively, and negative buss conductor 17 is connected to electrodes 12 and 14 by metallic connections 42 and 43 respectively. Dielectric board 11 having the channels 18, 19 and 20 for holding the fibers is overlaid with a transparent glass or plastic protective dielectric covering layer 60. Layer 60 advantageously confines fibers 21, 22, 23 and 33-38, permits their protection and visual observation, and provides electrical insulation to the electrodes 12-15 for safety and electrode protection as well.

Electrical switches 52, 53 and 54 control the polarity of coatings 26, 25 and 24 of optical fibers 23, 22 and 21 respectively. For exampl, if it be desired to test optical fiber 22 for presence of optical transmissions, switch 53 selects a connection, as shown, to the positive pole of DC voltage source 50 thereby connecting the positive pole of source 50 via conductor 31 through the silver paint 28 to coating 25. The voltage level required need not exceed approximately 400 volts. Coating 25 acquires a positive charge which is the same polarity as the charge on electrode 13 and opposite in polarity to the charge on electrode 14. Accordingly, by well-known electrostatic principles, an electrostatic force in the direction of electrode 14 is exerted on coating 25 and fiber 22. In response to the electrostatic force the optical fiber laterally moves in channel 19 toward electrode 14, thereby breaking optical connection with optical fiber 35 and making optical connection with optical test fiber 36.

When it is desired to complete the optical test and reestablish connection between fiber 22 and destination fiber 35, switch 53 is rotated clockwise so as to connect coating 25 to the negative pole of battery 50. Then, coating 25 acquires a negative charge which causes it to be repelled from electrode 14 and attracted to electrode 13, thus resulting in a lateral movement towards electrode 13 and reconnection with optical fiber 35. The repulsion in the early part of the switching operation is at a high level of strength due to the low separation between the repelling electrode and coating. The onset of switching is thus rendered certain and sensitive, permitting a relatively low DC voltage to be used. A similar description can be made regarding the operation of switches 54 and 52 and the optical fibers with coatings 24 and 26 respectively. Of course, if it be desired to dispense with separate switches 52-54 and test all of the source fibers 21-23 at once, switches 52-54 can readily be replaced by permanent connections to one pole of battery 50 and switch 51 replaced with an ON-OFF-ON DPDT polarity reversing switch in the lines 16 and 17 to battery 50. It will also be understood that alternative switching means such as vacuum tubes or high voltage transistors are usable instead of mechanical switches.

Figure 2:
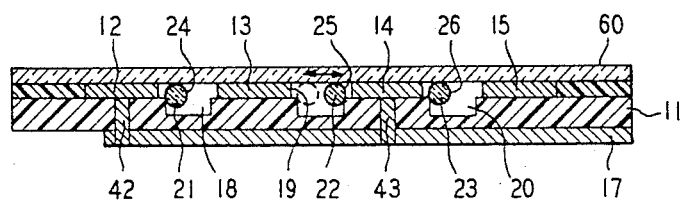
FIG. 2 shows a cross-section of the electrostatic optical switch board of FIG. 1.

FIG. 2 shows a cross-section of the electrostatic optical switch board 10 at a cut through conductor 17. Optical fibers 21, 22 and 23 respectively have metallic coatings 24, 25 and 26. The metallic coatings are suitably provided by dipping the fibers in aluminum paint or coating them by evaporation and deposition of aluminum or other conductive material in a previous manufacturing operation. The fibers so coated are laterally movable in channels 18, 19 and 20 of dielectric board 11.

Board 11 is suitably made of phenol or ceramic material. The channels in board 11 are suitably fabricated by means of sawing, casting or laser scribing, and the opposite sides of the channels form dielectric stops for the coated optical fibers. The board 11 is suitably provided in an initial stage of manufacture with coatings of a conductive film like gold or copper on both its top and bottom major surfaces. Conductive patterns in the film for the conductors and electrodes are etched by standard printed circuit photolithographic techniques to form the conductive areas 30, 31, 32, 12, 13, 14, 15, 16 and 17. The fabrication of grooves or channels 18, 19 and 20 can occur either prior to or subsequent to the etching process. Then holes are drilled, and soldering or other metallic connection is performed so as to form junctions 40 and 41 between conductor 16 and electrodes 13 and 15 respectively and junctions 42 and 43 between conductor 17 and electrodes 12 and 14 respectively. A cross-section of junctions 42 and 43 is shown in FIG. 2.

The optical fibers 21, 22 and 23 are suitably located as shown in FIG. 1 with fibers 33 through 38 and glued in the grooves. The movable fibers 21 through 23 are held by drops 27 through 29 of silver-loaded paint, aluminum paint or other electrically conductive adhesive. (In the present inventor's work a product was used which is designated "DUPONT Conductive Silver Composition 4817" of E. I. Dupont de Nemours & Co., Inc., Photoproduct Department, Wilmington, Del.) The cured drops simultaneously act as mechanical pivot points and electrical connections. They penetrate through holes in dielectric plate 11 so as to make contact respectively with conductors 32, 31 and 30. The fibers 33-38 are suitably affixed by any convenient adhesive, such as a product known as "DUCO cement," which by label indicates contents of acetone, butyl acetate and oil of mustard. A piece of glass, plastic or other insulator 60 is fastened to and over circuit board 11 so as to prevent entry of dust particles and to permit observation.

Figure 3:
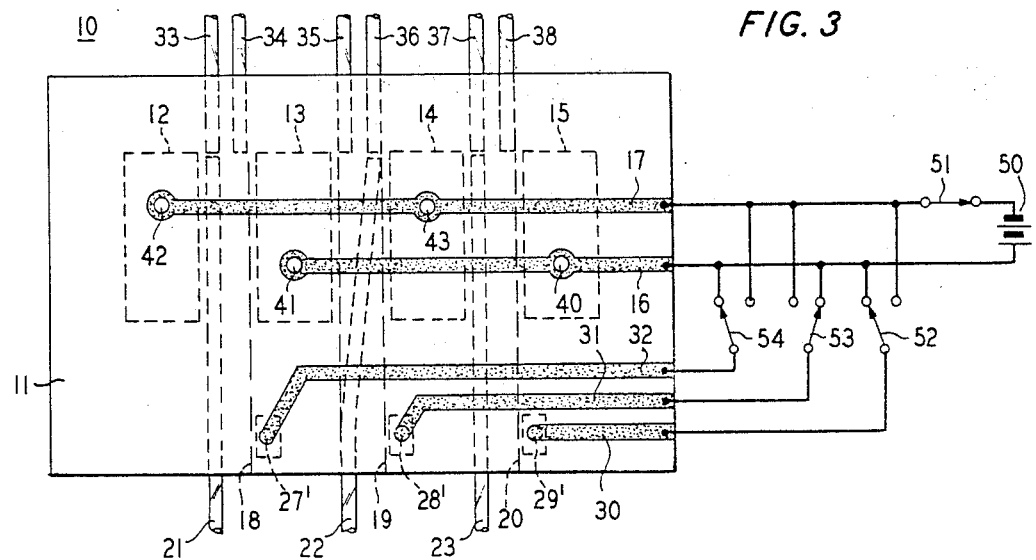
FIG. 3 shows a view of the opposite or bottom side of the electrostatic optical switch board of FIG. 1.

FIG. 3 shows the bottom of optical switch board 10. Conductors 30, 31, 32, 16 and 17 are clearly shown on the bottom surface beneath the channels and opposite the major surface to which the electrodes are attached. Insulation, not shown, like layer 60 may also be provided to protect the bottom surface conductors. The conductors couple and provide electrical voltages to the appropriate points as previously described in connection with FIG. 1 with the result that lateral movement of the conductively coated optical fibers can be electrostatically accomplished. In all respects the drawing of FIG. 3 corresponds to the views of FIG. 1 and FIG. 2 so that further discussion thereof is believed to be unnecessary.

Figure 4:
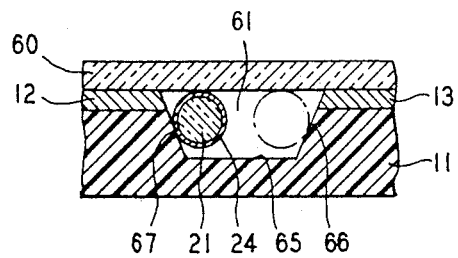
FIGS. 4, 5 and 6 show alternative cross-sections of the electrostatic optical fiber switch of the invention.

FIG. 4 shows a cross-section of board 11 which has been scribed or sawed directly through a top layer of conductor so as to form conductor segments 12 and 13 and a rectangular or trapezoidal fiber channel 61 having base 65 and straight or inclined sides or walls 66 and 67. Glass sheet 60 encloses fiber 21, which has a metallic coating 24, in the channel 61 which is filled with dielectric liquid. The dielectric liquid increases the electrostatic force thereby permitting lower electrode voltage, decreases the optical insertion loss between the movable fiber and the termination fiber switched to, increases the DC breakdown voltage of the switch (eliminating sparking), and damps the motion of and lubricates the movable fiber thereby reducing abrasion thereof.

When fiber 21 is attracted to electrode 12, as shown, the wall 67 prevents metallic coating 24 from disadvantageous shot-circuit contact with electrode 12. Similarly, when fiber 21 is attracted to electrode 13, as shown in phantom technique, the same function is provided by wall 66. The electrostatic force is generally sufficient to draw coated fiber 21 laterally upward so that the fiber is restrained by side 66 or 67 and glass 60. In both cases the opposite sides 66 and 67 are included in means of providing a dielectric stop which may involve glass 60 as well.

In an experimental test of the electrostatic switching effect, a ceramic board having a 1 mil gold coating was sawed to form two channels of rectangular cross-section 20 mils wide and 10 mils deep. Two 8 mil diameter optical fibers with 4 mil graded index cores and numerical aperture 0.36 having 1 micron (0.04 mil) thick evaporated chromium coatings were electrostatically movable laterally in the channels. One of the channels was selected for additional observations. With as little as 250 volts supply voltage applied across the halves of the gold coating resulting from the sawing operation for the channel, the fiber in this channel readily was switched. The channel was filled with an index matching immersion liquid of refractive index 1.505. A gallium aluminum arsenide (GaAlAs) light emitting diode at 0.85 microns wavelength was coupled to the movable coated fiber in the selected channel. Two termination fibers were affixed in the channel with a soft sticky wax by means of a micromanipulator while a microscope was used for observing correct placement of the fibers. Then the fibers were permanently affixed with DUCO cement in the channel. The termination fibers were brought out to an infrared viewer. Transmitted light was readily observed through the viewer in the termination fibers alternately as the movable fiber was switched, and the observed extinction was essentially complete.

Some abrasion of the thin chromium coating of the fiber in the unselected channel was noted after a number of trials as evidenced by an increased supply voltage being required to switch that fiber, however, This behavior appears to be capable of improvement by increasing the coating thickness or by improving the adhesion of the metal coating to the glass fiber, or both. The abrasion effect may be preventable by providing an additional tougher outer coating (not shown in FIG. 4) made by dipping the metal-coated fiber in DUCO cement diluted 100:1 by volume in methyl ethyl ketone and drying same.

Figure 5:
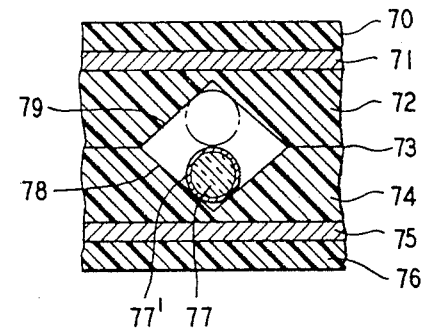

FIG. 5 shows another alternative cross-section for an optical fiber switch board of the invention. The switch board of FIG. 5 is actually a composite of two circuit boards, the first having metallic sheet 71 coated with dielectric layers 70 and 72, and the second having metallic sheet 75 coated with dielectric layers 76 and 74. An optical fiber 77 having metallic coating 77' is enclosed in grooves or channel sides 78 and 79, and the circuit boards are brought together at plane 73 so as to form a diamond-shaped channel for holding fiber 77 and termination fibers not shown. Fiber 77 can be attracted selectively toward metallic layer 71 or 75 by means of circuit connections like those hereinbefore described. Fiber 77 moves in a plane perpendicular to the parallel planes of the electrodes 71 and 75, unlike the other suggested embodiments in which the fiber motion is parallel to a single electrode plane. Dielectric layers 72 and 74 act as dielectric stops for preventing short circuits and utilize Vee-shaped grooves 78 and 79 for precision optical fiber location for advantageous optical coupling. A considerable number of independently switchable fiber switches may be located laterally along plane 73 with only the two electrodes 71 and 75 serving all of them.

Figure 6:
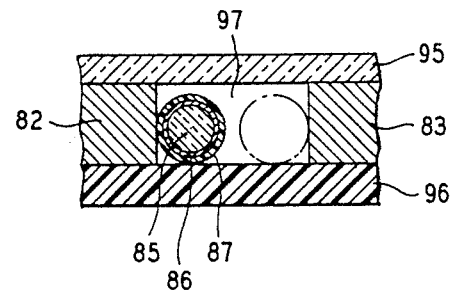

FIG. 6 shows a cross-section of a further embodiment of the invention. Phenolic board 96 has conductive electrode strips 82 and 83 and clear plastic 95 enclosing a rectangular space 97 therein. Optical fiber 85, having conductive coating 86, is provided with an additional dielectric coating 87 and is located within the enclosed switching space 97. The electrical polarity of conductive layer 86 is set so as to move the fiber 85 against either electrode 82 or 83. Dielectric coating 87 illustratively is formed by dipping the fiber in one part of DUCO cement appropriately diluted with as much as 100 parts methyl ethyl ketone ($CH_3COC_2H_5$) for appropriate thinness. Coating 87 acts as a stop member and short-circuit prevention layer by preventing electrical contact of the conductive coating 86 and the electrodes 82 and 83. In addition, this coating increases the capacitance C of the switch, thereby reducing the electrode voltage V required to place the same charge q on the elements of the switch according to the formula $q = CV$ and thus produce the same electrostatic forces.

Figure 7:
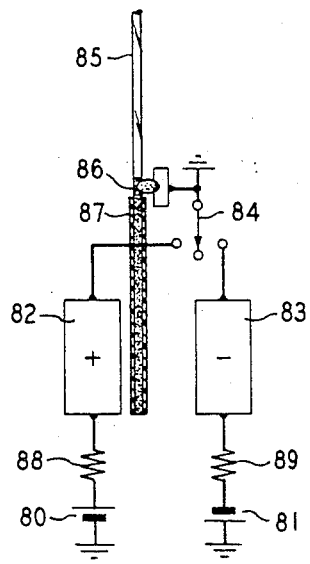
FIGS. 7 and 8 show partially pictorial, partially schematic diagrams of alternative electrical circuits usable in the inventive electrostatic optical fiber switch so as to make it operable by mere pulses of electricity.
Figure 8:
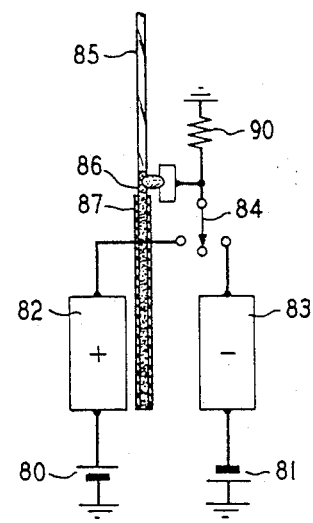

FIGS. 7 and 8 schematically show two alternative electrical circuits utilizing the embodiment of FIG. 6 by means of which mere pulses of energy suffice to accomplish the switching action. Of course, the circuits may be used with the embodiments of FIGS. 1-5 as well.

In FIG. 7, fiber 85 is provided with conductive coating 86, which is connected to ground, and with dielectric coating 87 as previously described. Electrodes 82 and 83 are selectably switchable to ground by ON-OFF-ON SPDT switch 84, but when switch 84 is in its center-OFF position, electrodes 82 and 83 bear positive and negative voltages respectively due to their connections to batteries 80 and 81 through resistors 88 and 89. In FIG. 8, the construction is the same as in FIG. 7 with the exception that the resistors 88 and 89 are eliminated and replaced with resistor 90 from ground to the conductive coating 86 and switch 84. In both cases, the batteries operate as a dual-polarity voltage source connected intermediately to coating 86 via a direct connection or a resistance as the respective case may be.

The principle of operation of the embodiments of both FIG. 7 and FIG. 8 may be readily understood according to the description which next follows. If switch 84 be set so as to connect electrode 83 to coating 86, then electrode 83 and coating 86 bear the same polarity of charge. This charge polarity is opposite to that of electrode 82. Accordingly, fiber 85 is attracted in the direction of electrode 82 and repelled from electrode 83. The electrical connection just mentioned need only be momentary since subsequent connection of switch 84 to the center-OFF position as shown leaves coating 86 connected to ground so that coating 86 still is electrostatically attracted to electrode 82.

If switch 84 be set so that electrode 82 is connected to coating 86, there will then arise an electrostatic repulsion between electrode 82 and coating 86 and a lateral attraction and movement of fiber 85 to electrode 83. Again, such a switch setting need only be momentary since a resetting of switch 84 to the center-OFF position will hold fiber 85 near electrode 83. This "memory" phenomenon occurs because once the fiber is near an electrode, its attraction to that electrode exceeds its attraction to the adjacent electrode in the center-OFF switch condition. Thus, a mere pulse of electricity due to momentary setting of switch 84 to one of its extreme positions suffices to switch fiber 85. An optical switch with memory is completed by providing additional optical fibers like fibers 33 and 34 of FIG. 1 near the end of fiber 85, the additional fibers not being shown in FIGS. 7 and 8 for clarity.

The embodiments of the invention hereinabove described are to be considered as being only illustrative and not exhaustive. Many embodiments of the invention can be fashioned using appropriate materials, shapes, dimensions and relative orientations so as to fully realize the utility of the invention by application of its principles.

What is claimed is:

1. An optical fiber switch assembly article comprising a dielectric plate having a plural number of substantially parallel channels defined in a first surface of said plate;

electrode strips equal in number to one more than the number of said channels and being disposed between and on either side of said channels;

a pair of electrical conductors connected to said electrode strips so that a DC voltage across said conductors is capable of producing electric charges of spatially alternating polarity on said electrode strips; and laterally movable optical fibers respectively located in said channels, said movable optical fibers each having a conductive coating capable of being electrically connected to one or the other of said conductors so as to produce an electrostatic force on said fibers, and a plural number of stationary optical fibers so located that an electrostatically induced movement of a predetermined number of said laterally movable optical fibers provides an optical connection between said movable optical fibers and a predetermined number of said stationary optical fibers.

2. The optical fiber switch assembly article claimed in claim 1 wherein said electrode strips are located on said first surface of said dielectric plate and said electrical conductors are located on a second surface of said plate opposite to said first surface and beneath said channels, said conductors being connected to said electrode strips through said plate, each said optical fiber coating being connected by an electrically conductive adhesive to a respective additional conductor on said second surface of said plate, whereby a convenient planar electrical-optical circuit construction is obtained.

3. The optical fiber switch assembly article of claim 1 wherein the cross section of each of said substantially parallel channels is shaped to preclude contact of said movable optical fibers with said electrode strips.

* * * * *